United States Patent
Cho et al.

(10) Patent No.: US 8,732,768 B2
(45) Date of Patent: May 20, 2014

(54) SYSTEM AND METHOD FOR PROVIDING VIRTUAL AV SERVICE

(71) Applicant: Electronics and Telecommunications Research Institute, Daejeon (KR)

(72) Inventors: Chunglae Cho, Daejeon (KR); Sung-Soo Kim, Daejeon (KR); Yun Kyung Park, Daejeon (KR); Jin Tae Kim, Daejeon (KR); Kyeong Deok Moon, Daejeon (KR); Jun Hee Park, Daejeon (KR); Ji Yeon Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/758,530

(22) Filed: Feb. 4, 2013

(65) Prior Publication Data

US 2013/0326566 A1 Dec. 5, 2013

(30) Foreign Application Priority Data

May 31, 2012 (KR) ........................ 10-2012-0058683

(51) Int. Cl.
  *H04N 7/18* (2006.01)
(52) U.S. Cl.
  USPC .................. 725/74; 725/80; 725/85; 725/100
(58) Field of Classification Search
  USPC ....................................... 725/74, 80, 85, 100
  See application file for complete search history.

(56) References Cited

U.S. PATENT DOCUMENTS

| 7,548,960 | B2 * | 6/2009 | Kang et al. ..................... 709/218 |
| 8,356,113 | B2 * | 1/2013 | Jonsson et al. ................ 709/246 |
| 2006/0056449 | A1 * | 3/2006 | Morioka ........................ 370/466 |
| 2006/0133391 | A1 * | 6/2006 | Kang et al. ..................... 370/401 |
| 2007/0118606 | A1 * | 5/2007 | Duncan et al. ................ 709/217 |
| 2009/0024717 | A1 * | 1/2009 | Im ................................. 709/218 |
| 2010/0011099 | A1 * | 1/2010 | Chintada et al. .............. 709/224 |

FOREIGN PATENT DOCUMENTS

| KR | 10-0284768 | 3/2001 |
| KR | 10-2005-0077672 | 8/2005 |
| KR | 10-2006-0034074 | 4/2006 |
| KR | 10-1105224 | 1/2012 |

OTHER PUBLICATIONS

Cho, Chunglae et al., "Enhancing Home Entertainment Experience with Virtual UPnP Media Renderers," 2012 International Conference ICT Convergence (ICTC), pp. 270-271 (2012).

* cited by examiner

*Primary Examiner* — Mulugeta Mengesha
(74) *Attorney, Agent, or Firm* — Nelson Mullins Riley & Scarborough LLP; Anthony A. Laurentano, Esq.

(57) ABSTRACT

A system for providing virtual AV service includes a local device middleware (LDM) media server which stores AV contents and a resource cooperation server (RCS) which separates the AV contents from the LDM media server into video contents and audio contents. The video contents and the audio contents are reproduced by an LDM video renderer and an LDM audio renderer, respectively. An LDM control point (LDMCP) controls the LDM media server and the LDM media renderers using the LDM protocol and a virtual device ensembler (VDE) controls the RCS and the LDMCP.

10 Claims, 3 Drawing Sheets

SYSTEM AND METHOD FOR PROVIDING VIRTUAL AV SERVICE

CROSS-REFERENCE(S) TO RELATED APPLICATION(S)

The present invention claims priority of Korean Patent Application No. 10-2012-0058683, filed on May 31, 2012, which is incorporated herein by reference.

FIELD OF THE INVENTION

The present invention relates to audio/video (AV) contents reproduction, and more particularly, to a virtual AV service system and method capable of reproducing AV contents with a virtual AV device.

BACKGROUND OF THE INVENTION

Currently, various methods have been proposed that couple several media processing devices and configure a single virtual media device to provide AV services. A typical example of local device middleware for configuring such a virtual media device is universal plug and play (UPnP).

However, conventional virtual media devices have restriction that they simply couples several media servers to provide a single virtual media server, provide a method for accessing contents of a media server that does not support local device middleware, or need to select only a single reproducing device in selecting a device for reproducing original AV contents.

Thus, with the foregoing conventional techniques, a device for reproducing video contents and a device for reproducing audio contents cannot be differently set in reproducing AV contents, and thus users cannot experience various types of AV contents reproduction services.

SUMMARY OF THE INVENTION

In view of the above, therefore, the present invention provides a system and method for providing virtual AV service, which is capable of enabling a device for reproducing video contents and a device for reproducing audio contents to be separately designated in reproducing AV contents.

Further, the present invention provides a system and method for providing virtual AV service, which is capable of allowing a media server, a video renderer, and an audio renderer supporting existing local device middleware to be used without being changed in order to support a virtual AV service.

In accordance with an aspect of the present invention, there is provided a system for providing virtual audio/video (AV) service, which includes: a local device middleware (LDM) media server configured to be controlled by an LDM protocol and store AV contents; a resource cooperation server (RCS) configured to receive the AV contents from the LDM media server, separate the received AV contents into video contents and audio contents, and serve as a media server of the separated video contents and audio contents; an LDM video renderer configured to receive the video contents and reproduce the video contents; an LDM audio renderer configured to receive the audio contents and reproduce the audio contents; an LDM control point (LDMCP) configured to control the LDM media server and the LDM media renderer using the LDM protocol; and a virtual device ensembler (VDE) configured to control the RCS and the LDMCP.

Preferably, the VDE is configured to transmit information regarding original AV contents requested for reproducing to the RCS and the RCS is configured to transmit information regarding virtual video contents and information regarding virtual audio contents corresponding to the original AV contents to the VDE.

Preferably, the information regarding virtual video contents and the information regarding virtual audio contents include server address of the virtual video contents and the virtual audio contents and protocol information.

Preferably, the LDMCP is configured to provide the information regarding virtual video contents and the information regarding virtual audio contents to the LDM video renderer and the LDM audio renderer.

In accordance with another aspect of the present invention, there is provided a method for providing virtual AV service, which includes: transmitting, in response to a request for reproducing AV contents, at a virtual device ensembler (VDE), information regarding AV contents requested to be reproduced to a resource cooperation server (RCS); requesting, at the RCS, a local device middleware (LDM) media server to provide the AV contents, and separating the received AV contents into video contents and audio contents; transmitting, at the RCS, virtual contents information to the VDE; requesting, at the VDE, an LDM control point (LDMCP) to reproduce the virtual video and audio contents; requesting, at the LDMCP, an LDM video renderer and an LDM audio renderer to reproduce the virtual video and audio contents; receiving, at the LDM video renderer, the video contents from the RCS and reproducing the same; and receiving, at the LDM audio renderer, the audio contents from the RCS to reproduce the same.

Preferably, the transmitting virtual contents information to the VDE comprises transmitting information regarding virtual video contents and information regarding virtual audio contents corresponding to the original AV contents to the VDE.

Preferably, the information regarding virtual video contents and the information regarding virtual audio contents comprises server address of the virtual video contents and the virtual audio contents and protocol information.

Preferably, the requesting an LDM video renderer and an LDM audio renderer to reproduce the virtual video and audio contents comprises providing the information regarding virtual video contents and the information regarding virtual audio contents to the LDM video renderer and the LDM audio renderer.

Preferably, the AV contents are provided from the LDM media server to the RCS in the form of streaming.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENTS

Hereinafter, embodiments of the present invention will be described in detail with the accompanying drawings.

Figure 1:
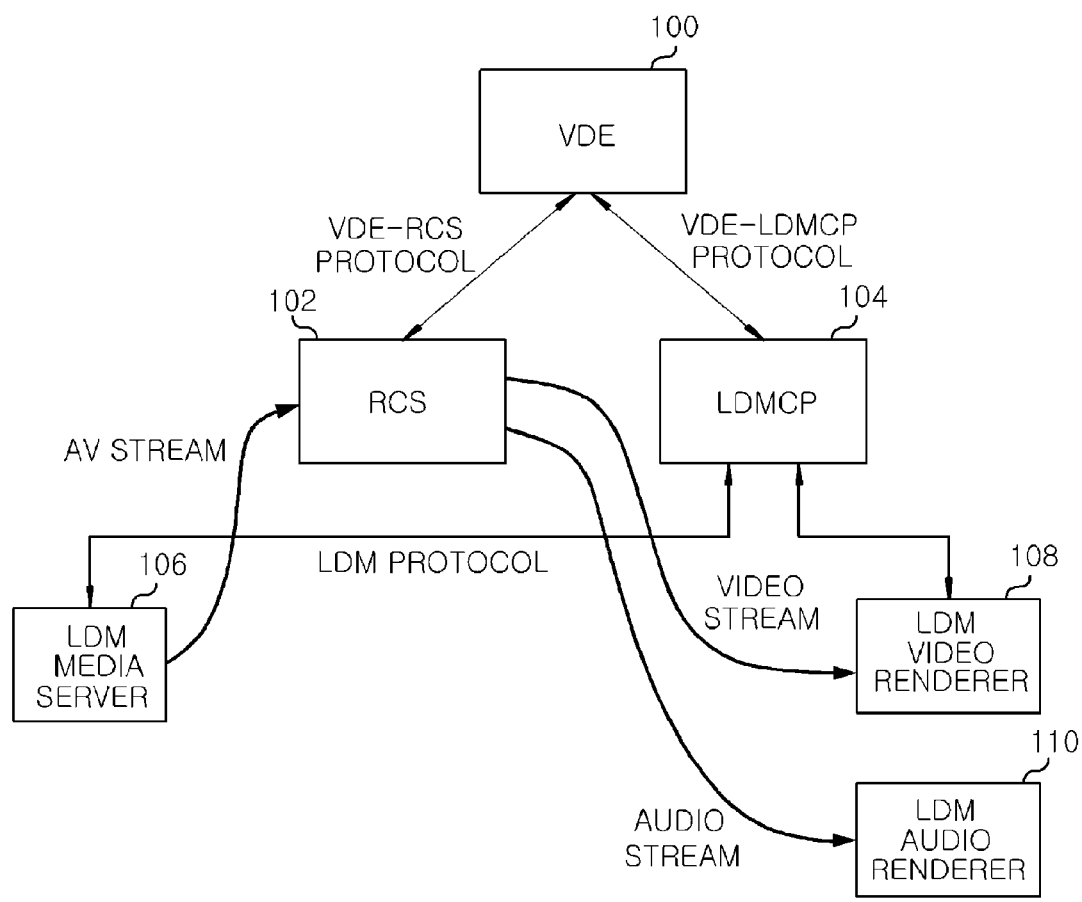
FIG. 1 illustrates a block diagram of the configuration of a virtual AV service system in accordance with an embodiment of the present invention.

FIG. 1 illustrates a block diagram of the configuration of a virtual AV service system in accordance with an embodiment of the present invention.

Referring to FIG. 1, the virtual AV service system includes a local device middleware (LDM) media server 106 supporting LDM, an LDM video renderer 108 supporting the LDM, an LDM audio renderer 110 supporting the LDM, a resource cooperation server (RCS) 102, an LDM control point (LDMCP) 104, and a virtual device ensembler (VDE) 100.

In the embodiment, UPnP will be described as an example of local device middleware but not limited thereto, and it may be applied to any middleware for automatically detecting and controlling devices on a network.

The LDM media server 106 has AV contents stored in an internal storage device or an external storage device, is controlled by an LDM protocol, and serves as a streaming server for providing the AV contents to LDM media renderer connected to the network.

The LDM video renderer 108 is controlled by an LDM protocol and receives video contents from the LDM media server 106 to reproduces the video contents.

The LDM audio renderer 110 receives audio contents from the LDM media server 106 to reproduce the audio contents.

The RCS 102 receives video/audio contents from the LDM media server 106, separates the same into video contents and audio contents. The RCS 102 serves as a virtual video contents server and a virtual audio contents server.

The VDE 100 transmits a control message to the RCS 102 and the LDMCP 104 to group the LDM media server 106, the LDM video renderer 108, and the LDM audio renderer 110 so as to be used as a new virtual AV device.

Figure 2:
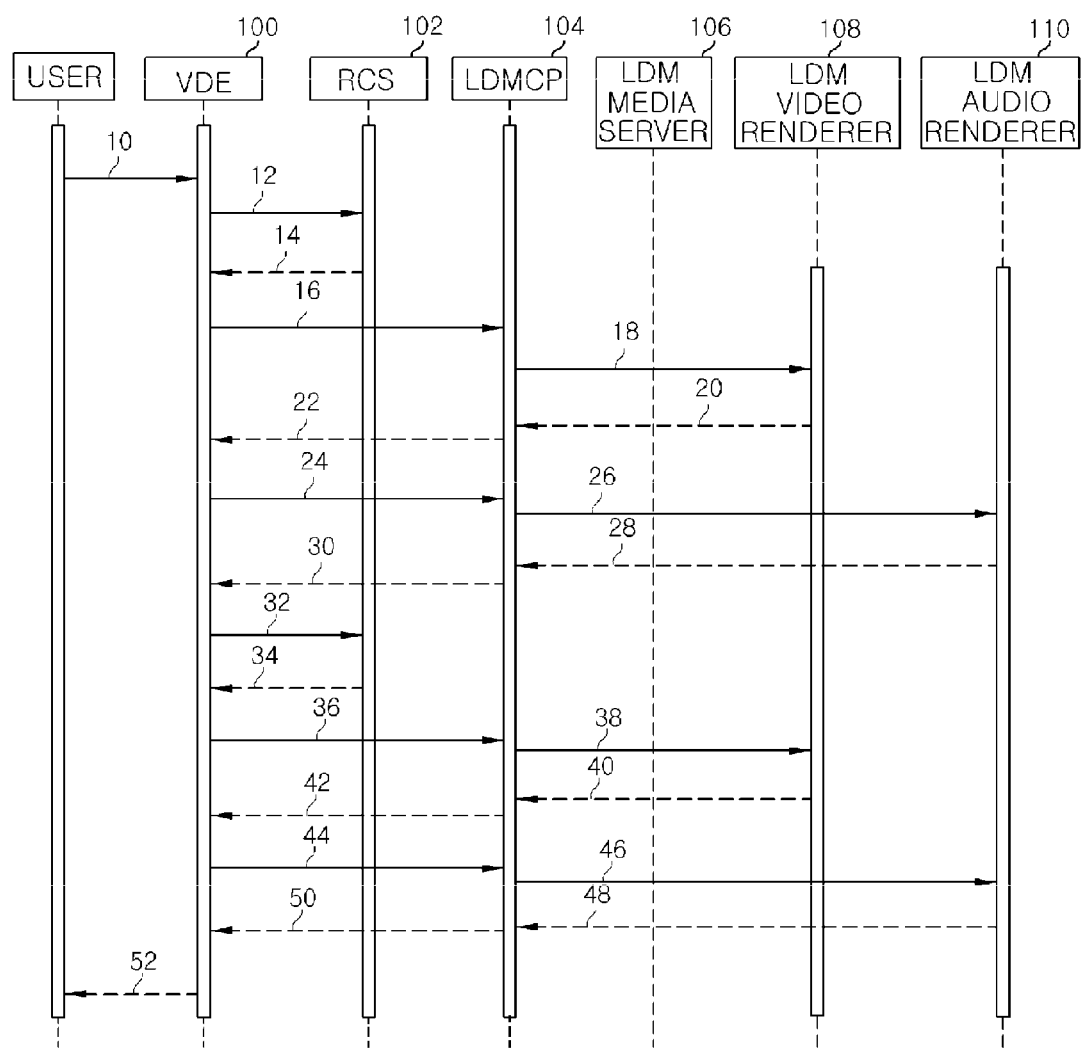
FIG. 2 is a sequence diagram illustrating a process for reproducing AV contents in a virtual AV device in accordance with an embodiment of the present invention.

FIG. 2 illustrates a sequence diagram illustrating a process for reproducing AV contents in a virtual AV device composed of the LDM media server 106, the LDM video renderer 108, and the LDM audio renderer 110 in accordance with an embodiment of the present invention.

First, in operation 10, a user selects a virtual AV device to be controlled, designates any AV contents of the LDM media server 106 registered with the virtual AV device, and requests the VDE 100 to reproduce the designated AV contents in the virtual AV device.

In operation 12, in response to the request for reproducing AV contents, the VDC 100 provides information (location of the AV contents, protocol information of contents, etc.) regarding original AV contents to be reproduced to the RCS 102 and requests preparation of controlling the original AV contents in the virtual AV device.

In operation 14, in response to operation 12, the RCS 102 provides information regarding the virtual video contents (server address of the video contents and protocol information) corresponding to the designated original AV contents and information regarding the virtual audio contents (server address of the audio contents and protocol information) to the VDE 100.

In operation 16, the VDE 100 requests the LDMCP 104 to transfer the information regarding the virtual video contents to the LDM video renderer 108 registered with the virtual AV device.

The LDMCP 104 provides the information regarding the virtual video contents to the LDM video renderer 108 in operation 18, and the LDM video renderer 108 responds thereto with its safe acknowledgement in operation 20.

In operation 22, the LDMCP 104 responds to the VDE 100 that it has successfully processed the request in operation 16.

In operation 24, the VDE 100 requests the LDMCP 104 to transfer the information regarding the virtual audio contents to the LDM audio renderer 110 registered with the virtual AV device.

In operation 26, the LDMCP 104 provides the information regarding the virtual audio contents to the LDM audio renderer 110. In operation 28, the LDM audio renderer 110 responds thereto with its safe acknowledgement.

In operation 30, the LDMCP 104 responds to the VDE 100 that the request in operation 24 has been successfully processed.

In operation 32, the VDE 100 requests the RCS 102 to start reception of the original AV contents and preparation of transmission of the virtual video contents and the virtual audio contents.

In operation 34, the RCS 102 starts to receive the original AV contents, separates the received original AV contents into video contents and audio contents, prepares to transmit the video contents and the audio contents from a virtual video server and a virtual audio server, respectively, and then informs the VDE 100 that it is ready.

In operation 36, the VDE 100 requests the LDMCP 104 to transfer the request for reproducing virtual video to the LDM video renderer 108.

Subsequently, in operation 38, the LDMCP 104 transfers the request for reproducing virtual video to the LDM video renderer 108.

In operation 40, the LDM video renderer 108 receives the video contents from the virtual video server and starts to reproduce the same, and responds to the LDMCP 104 that it has successfully processed the request in operation 38.

Then, in operation 42, the LDMCP 104 responds to the VDE 100 that it has successfully processed the request in operation 36.

In operation 44, the VDE 100 requests the LDMCP 104 to transfer the request for reproducing virtual audio to the LDM audio renderer 110.

In operation 46, the LDMCP 104 transfers the request for reproducing virtual audio to the LDM audio renderer 110.

Then, in operation 48, the LDM audio renderer 110 receives the audio contents from the virtual audio server and starts to reproduce it, and responds to the LDMCP 104 that it has successfully processed the request in operation 46.

In operation 50, the LDMCP 104 responds to the VDE 100 that it has successfully processed the request in operation 44.

Then, in operation 52, the VDE 100 responds to the user that the request for reproducing the virtual AV device has been successfully processed.

Figure 3:
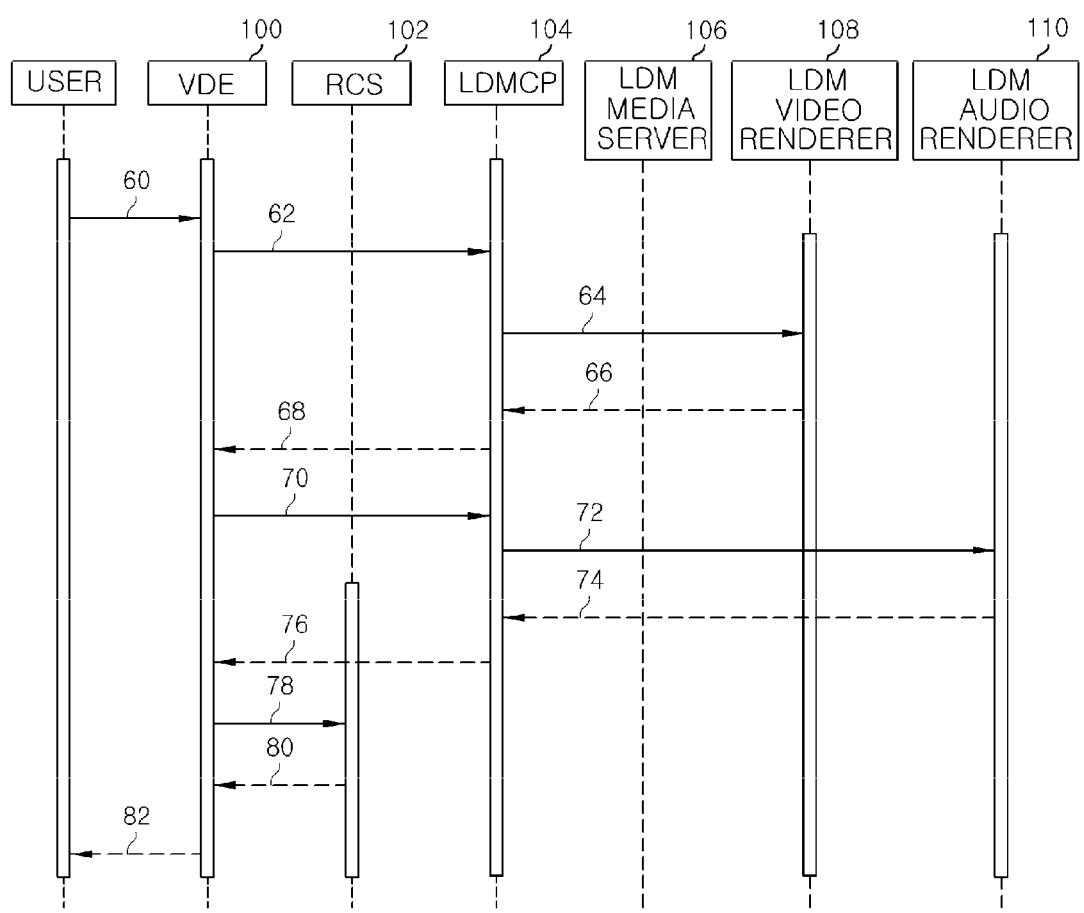
FIG. 3 is a sequence diagram illustrating a process for stopping reproducing of AV contents in the virtual AV device in accordance with an embodiment of the present invention.

FIG. 3 illustrates a sequence diagram illustrating a process for stopping reproducing of AV contents in a virtual AV device composed of the LDM media server 106, the LDM video renderer 108, and the LDM audio renderer 110 in accordance with the present invention.

First, in operation 60, the user requests the VDE 100 to stop reproducing of AV contents in the virtual AV device.

In response to the request for stopping reproducing of AV contents, in operation 62, the VDE 100 requests the LDMCP 104 to transfer the request for stopping reproducing of virtual video to the LDM video renderer 108.

Then, in operation 64, the LDMCP 104 transfers the request for stopping reproducing of virtual video to the LDM video renderer 108.

In operation 66, the LDM video renderer 108 stops receiving of video contents form the virtual video server, simultaneously stops reproduction, and responds to the LDMCP 104 that it has successfully processed the request in operation 64.

Subsequently, in operation 68, the LDMCP 104 responds to the VDE 100 that the request in operation 62 has been successfully processed.

In operation 70, the VDE 100 requests the LDMCP 104 to transfer the request for stopping reproducing of virtual audio to the LDM audio renderer 110.

In operation 72, the LDMCP 104 transfers the request for stopping reproducing of virtual audio to the LDM audio renderer 110.

In operation 74, the LDM audio renderer 110 stops receiving of the audio contents from the virtual audio server, simultaneously stops reproduction, and responds to the LDMCP 104 that the request in operation 72 has been successfully processed.

In operation 76, the LDMCP 104 responds to the VDE 100 that the request in operation 70 has been successfully processed.

In operation 78, the VDE 100 requests the RCS 102 to stop reception of the original AV contents and transmission of virtual video contents and virtual audio contents.

Then, in operation 80, the RCS 104 stops receiving of the original AV contents, stops transmission of virtual video and virtual audio from the virtual video server and the virtual audio server, and informs the VDE 100 accordingly.

In operation 82, the VDE 100 responds to the user that the request for stopping reproducing of the virtual AV device has been successfully processed.

As described above, the present invention provides a method for reproducing AV contents by configuring a single virtual AV device by combining the media server, the video renderer, and the audio renderer supporting local device middleware. In configuring the virtual AV device, a device for reproducing video contents and a device for reproducing audio contents are separately designated in reproducing AV contents, and thus, a user can advantageously configure various virtual AV devices and reproduce AV contents. Further, in order to support such services, the media server, the video renderer, and the audio renderer supporting existing local device middleware can be advantageously used as it is without being changed.

While embodiments have been shown and described, embodiments are not limited thereto. It will be understood by those skilled in the art that various changes and modifications may be made without departing from the scope of the embodiments as defined in the following claims.

What is claimed is:

1. A system for providing virtual audio/video (AV) service, the system comprising:
   a local device middleware (LDM) media server configured to be controlled by an LDM protocol and store AV contents;
   a resource cooperation server (RCS) configured to receive the audio/video (AV) contents from the LDM media server, separate the received audio/video (AV) contents into video contents and audio contents, and serve as a media server of the separated video contents and audio contents;
   an LDM video renderer configured to receive the video contents and reproduce the video contents;
   an LDM audio renderer configured to receive the audio contents and reproduce the audio contents;
   an LDM control point (LDMCP) configured to control the LDM media server and the LDM media renderer using the LDM protocol; and
   a virtual device ensembler (VDE) configured to control the RCS and the LDMCP.

2. The system of claim 1, wherein the VDE is configured to transmit information regarding original audio/video (AV) contents requested for reproducing to the RCS.

3. The system of claim 1, wherein the RCS is configured to transmit information regarding virtual video contents and information regarding virtual audio contents corresponding to the original audio/video (AV) contents to the VDE.

4. The system of claim 3, wherein the information regarding virtual video contents and the information regarding virtual audio contents comprises server address of the virtual video contents and the virtual audio contents and protocol information.

5. The system of claim 3, wherein the LDMCP is configured to provide the information regarding virtual video contents and the information regarding virtual audio contents to the 15 LDM video renderer and the LDM audio renderer.

6. A method for providing virtual audio/video (AV) service, the method comprising:
   transmitting, in response to a request for reproducing audio/video (AV) contents, at a virtual device ensembler (VDE), information regarding audio/video (AV) contents
   requested to be reproduced to a resource cooperation server (RCS); requesting, at the RCS, an local device middleware (LDM) media server to provide the audio/video (AV) contents, and separating the received audio/video (AV) contents into video contents and audio contents;
   transmitting, at the RCS, virtual contents information to the VDE; requesting, at the VDE, an LDM control point (LDMCP) to reproduce the virtual video and audio contents;
   requesting, at the LDMCP, an LDM video renderer and an LDM audio renderer to reproduce the virtual video and audio contents;
   receiving, at the LDM video renderer, the video contents from the RCS and reproducing the same; and
   receiving, at the LDM audio renderer, the audio contents from the RCS to reproduce the same.

7. The method of claim 6, wherein said transmitting virtual contents information to the VDE comprises transmitting information regarding virtual video contents and information regarding virtual audio contents corresponding to the original audio/video (AV) contents to the VDE.

8. The method of claim 7, wherein the information regarding virtual video contents and the information regarding virtual audio contents comprises server address of the virtual video contents and the virtual audio contents and protocol information.

9. The method of claim 6, wherein said requesting an LDM video renderer and an LDM audio renderer to reproduce the virtual video and audio contents comprises providing the information regarding virtual video contents and the information regarding virtual audio contents to the LDM video renderer and the LDM audio renderer.

10. The method of claim 6, wherein the audio/video (AV) contents are provided from the LDM media server to the RCS in the form of streaming.

* * * * *